United States Patent
Nakagawa et al.

(10) Patent No.: US 7,916,197 B2
(45) Date of Patent: Mar. 29, 2011

(54) IMAGING DEVICE

(75) Inventors: Kazuko Nakagawa, Kunitachi (JP); Jun Takayama, Tama (JP)

(73) Assignee: Konica Minolta Holdings, Inc., Tokyo (JP)

( * ) Notice: Subject to any disclaimer, the term of this patent is extended or adjusted under 35 U.S.C. 154(b) by 626 days.

(21) Appl. No.: 11/883,898

(22) PCT Filed: Feb. 2, 2006

(86) PCT No.: PCT/JP2006/301728
§ 371 (c)(1),
(2), (4) Date: Aug. 7, 2007

(87) PCT Pub. No.: WO2006/085464
PCT Pub. Date: Aug. 17, 2006

(65) Prior Publication Data
US 2009/0153713 A1 Jun. 18, 2009

(30) Foreign Application Priority Data
Feb. 10, 2005 (JP) ................. 2005-034524

(51) Int. Cl.
H04N 3/14 (2006.01)
H04N 5/335 (2006.01)
H01L 27/00 (2006.01)

(52) U.S. Cl. .............. 348/308; 250/208.1; 348/302

(58) Field of Classification Search ............... 348/221.1, 348/229.1, 230.1, 294, 296, 297, 364, 362; 250/214 AG, 214 AL, 214 L, 208.1; 257/291
See application file for complete search history.

(56) References Cited

U.S. PATENT DOCUMENTS

| 5,047,861 A * | 9/1991 | Houchin et al. ............... 348/247 |
| 6,191,408 B1 * | 2/2001 | Shinotsuka et al. ........ 250/208.1 |
| 6,697,112 B2 * | 2/2004 | Morris et al. ................. 348/302 |

(Continued)

FOREIGN PATENT DOCUMENTS

JP 03-030350 A 2/1993

(Continued)

OTHER PUBLICATIONS

International Search Report (and English language translation) dated May 16, 2006, issued in International Application No. PCT/JP2006/301728.

(Continued)

*Primary Examiner* — Jason Chan
*Assistant Examiner* — Pritham Prabhakher
(74) *Attorney, Agent, or Firm* — Holtz, Holtz, Goodman & Chick, PC

(57) ABSTRACT

An imaging device including an imaging element having a plurality of pixels for switching a linear conversion mode for linearly converting incident light to an electric signal and a logarithm conversion mode for logarithmically converting incident light to an electric signal on the basis of incident light intensity,
a conversion unit for converting and outputting a reference electric signal converted logarithmically and outputted from the imaging element to an electric signal obtained by linearly converting an electric signal before logarithm conversion,
a correction unit, when an electric signal converted logarithmically and outputted from the imaging element is varied from the reference electric signal, for correcting it so as to coincide with the reference electric signal, and a circuit for giving the corrected electric signal to the conversion unit.

16 Claims, 7 Drawing Sheets

U.S. PATENT DOCUMENTS

| | | | |
|---|---|---|---|
| 7,256,378 B2 * | 8/2007 | Furukawa et al. | 250/208.1 |
| 7,443,427 B2 * | 10/2008 | Takayanagi | 348/223.1 |
| 7,667,760 B2 * | 2/2010 | Nakajima et al. | 348/333.12 |
| 2004/0069929 A1 | 4/2004 | Furukawa et al. | |
| 2004/0227109 A1 * | 11/2004 | Storm et al. | 250/551 |
| 2005/0104978 A1 | 5/2005 | Shinotsuka | |
| 2006/0044436 A1 * | 3/2006 | Watanabe | 348/308 |

FOREIGN PATENT DOCUMENTS

| | | |
|---|---|---|
| JP | 05-030350 A | 2/1993 |
| JP | 11-211565 A | 8/1999 |
| JP | 11-298799 A | 10/1999 |
| JP | 2000-175108 A | 6/2000 |
| JP | 2002-223392 A | 8/2002 |
| JP | 2002-290835 A | 10/2002 |
| JP | 2004-088312 A | 3/2004 |
| JP | 2004-356866 A | 12/2004 |
| WO | WO 02/45414 A1 | 6/2002 |
| WO | WO 03/026282 A1 | 3/2003 |

OTHER PUBLICATIONS

Chinese Office Action dated Mar. 6, 2009 (5 pages), and English translation thereof (6 pages), issued in counterpart Chinese Application Serial No. 2006800038163.

Japanese Office Action dated Jun. 22, 2010 (and English translation thereof) in counterpart Japanese Application No. 2007-502572.

* cited by examiner

IMAGING DEVICE

This application is a U.S. National Phase Application under 35 USC 371 of International Application PCT/JP2006/301728 filed Feb. 2, 2006.

TECHNICAL FIELD

The present invention relates to an imaging device having an imaging element for converting incident light to an electric signal.

BACKGROUND

Conventionally, in an imaging device such as a digital camera, an imaging element having a plurality of pixels for converting incident light to an electric signal is installed. These plurality of pixels switch the conversion mode to the electric signal on the basis of the incident light intensity and more in detail, switches the linear conversion mode for linearly converting the incident light to an electric signal and the logarithm conversion mode for logarithmically converting it. Further, at the later stage of the imaging element, a signal processing unit for performing characteristic conversion for converting the electric signal obtained by the logarithm conversion mode to a state obtained by the linear conversion mode or converting the electric signal obtained by the linear conversion mode to a state obtained by the logarithm conversion mode is installed, thus all the electric signals are unified to a state obtained by the linear conversion mode or logarithm conversion mode and the processing of the electric signals is simplified.

According to such an imaging element, compared with an imaging element for performing only the linear conversion mode, the timing range of an electric signal is extended, so that even if an object having a wide brightness range is imaged, all the brightness information can be expressed by an electric signal.

On the other hand, the plurality of pixels aforementioned have variations in the I/O characteristic due to differences between the pixels. Therefore, as a method for canceling such variations, there is a method available for correcting output from each pixel and making it coincide with a reference output value (for example, refer to Patent Documents 1 and 2).

Patent Document 1: Japanese Patent Application Hei 11-298799
Patent Document 2: Japanese Patent Application Hei 5-30350

DISCLOSURE OF THE INVENTION

Problems to be Solved by the Invention

However, in the correction methods disclosed in the patent documents aforementioned, when the I/O characteristic is fluctuated due to the drive conditions such as the imaging conditions and environmental conditions, a variation between the reference output value under the reference conditions and an actual pixel output value cannot be corrected. Therefore, all the electric signals cannot be unified exactly to a state obtained by the linear conversion mode or logarithm conversion mode.

A problem of the present invention is to provide an imaging device capable of exactly unifying electric signals to a state obtained by the linear conversion or logarithm conversion.

Means for Solving the Problems

The invention stated in Item 1 is characterized in that an image device comprises:
an imaging element having a plurality of pixels for switching a linear conversion mode for linearly converting incident light to an electric signal and a logarithm conversion mode for logarithmically converting incident light to an electric signal on the basis of incident light intensity,
a conversion unit for converting and outputting a reference electric signal converted logarithmically and outputted from the imaging element to an electric signal obtained by linearly converting an electric signal before logarithm conversion,
a correction unit, when an electric signal converted logarithmically and outputted from the imaging element is varied from the reference electric signal, for correcting it so as to coincide with the reference electric signal, and a circuit for giving the corrected electric signal to the conversion unit.

Further, the invention stated in Item 8 is characterized in that an image device comprises:
an imaging element having a plurality of pixels for linearly converting and outputting an electric signal based on incident light intensity until predetermined light intensity is obtained, thereafter logarithmically converting and outputting the electric signal based on the incident light intensity,
a conversion unit for converting and outputting a reference electric signal converted logarithmically and outputted from the imaging element to an electric signal obtained by linearly converting an electric signal before logarithm conversion,
a correction unit, when an electric signal converted logarithmically and outputted from the imaging element is varied from the reference electric signal, for correcting it so as to coincide with the reference electric signal, and a circuit for giving the corrected electric signal to the conversion unit.

Further, the invention stated in Item 12 is characterized in that an image device comprises:
an imaging element having a plurality of pixels for linearly converting and outputting an electric signal based on incident light intensity until predetermined light intensity is obtained, thereafter logarithmically converting and outputting the electric signal based on the incident light intensity,
a derivation unit for deriving an inflection point signal at the point where the linear conversion is switched to the logarithm conversion,
a comparison unit for comparing the inflection point signal derived by the derivation unit with the electric signal outputted from the imaging element,
a conversion unit, as a result of comparison, when the inflection point signal is large, for converting and outputting a reference electric signal converted logarithmically and outputted from the imaging element to an electric signal obtained by linearly converting an electric signal before logarithm conversion,
a correction unit, when an electric signal converted logarithmically and outputted from the imaging element is varied from the reference electric signal, for correcting it so as to coincide with the reference electric signal, and a circuit for giving the corrected electric signal to the conversion unit.

Effects of the Invention

According to the present invention, electric signals converted logarithmically can be exactly unified to a state obtained from the linear conversion. Furthermore, according to the present invention, electric signals converted logarithmically can be unified to a state obtained from the linear conversion without using a complicated circuit.

DESCRIPTION OF NUMERALS

Figure 1:
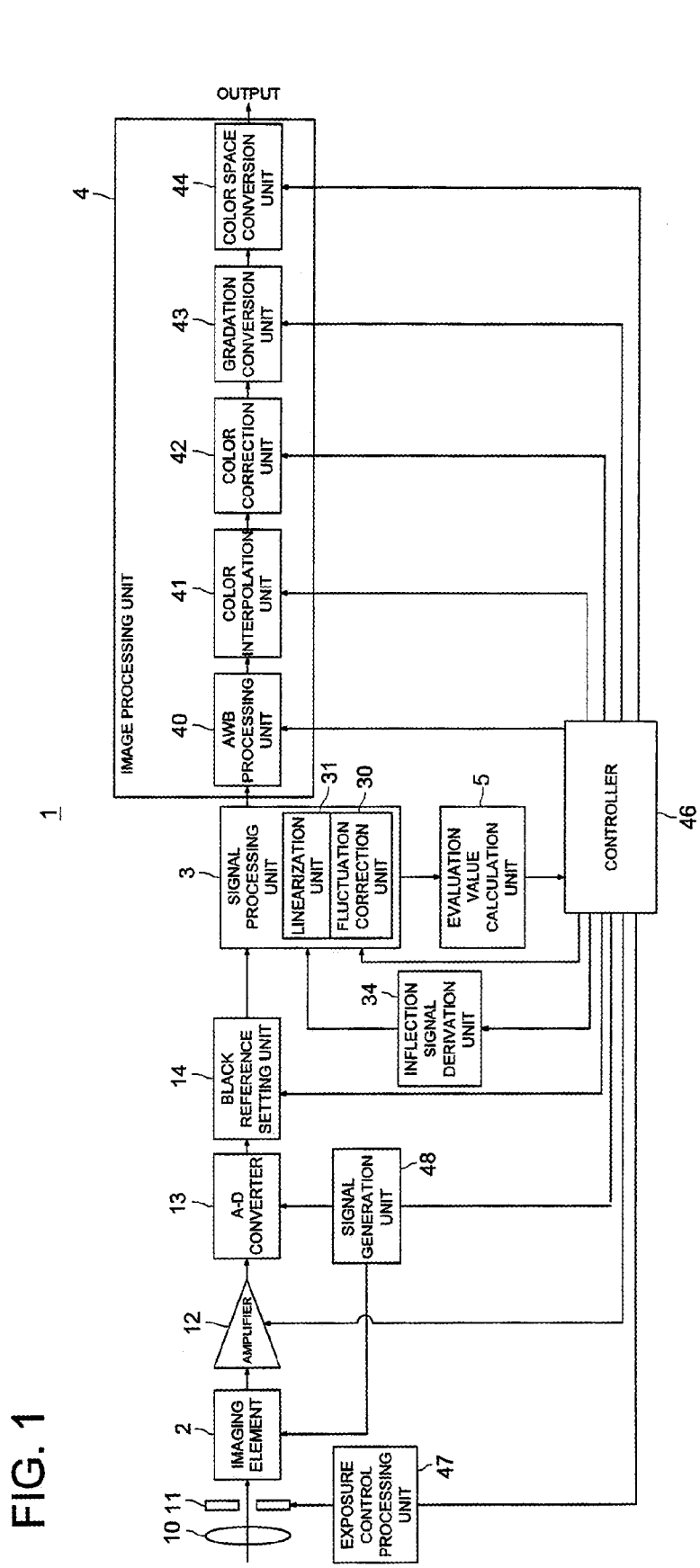
FIG. 1 is a block diagram showing the schematic constitution of the imaging device relating to the preset invention.

1 Imaging device
2 Imaging element
3 Signal processing unit
30 Fluctuation correction unit
31 Linearization unit (characteristic conversion unit)
32 Factor derivation unit
32a Lookup table
33 Processing unit
34 Inflection signal derivation unit
34a Lookup table
G11 to Gmn Pixel

DESCRIPTION OF THE PREFERRED EMBODIMENTS

Embodiment

Hereinafter, the embodiment of the present invention will be explained with reference to the accompanying drawings.

FIG. 1 is a block diagram showing the schematic constitution of an imaging device 1 relating to the preset invention.

As shown in the drawing, an imaging device 1 has an imaging element 2 for receiving incident light via a lens group 10 and an aperture diaphragm 11. For these lens group 10 and aperture diaphragm 11, well-known ones are used conventionally.

Figure 2:
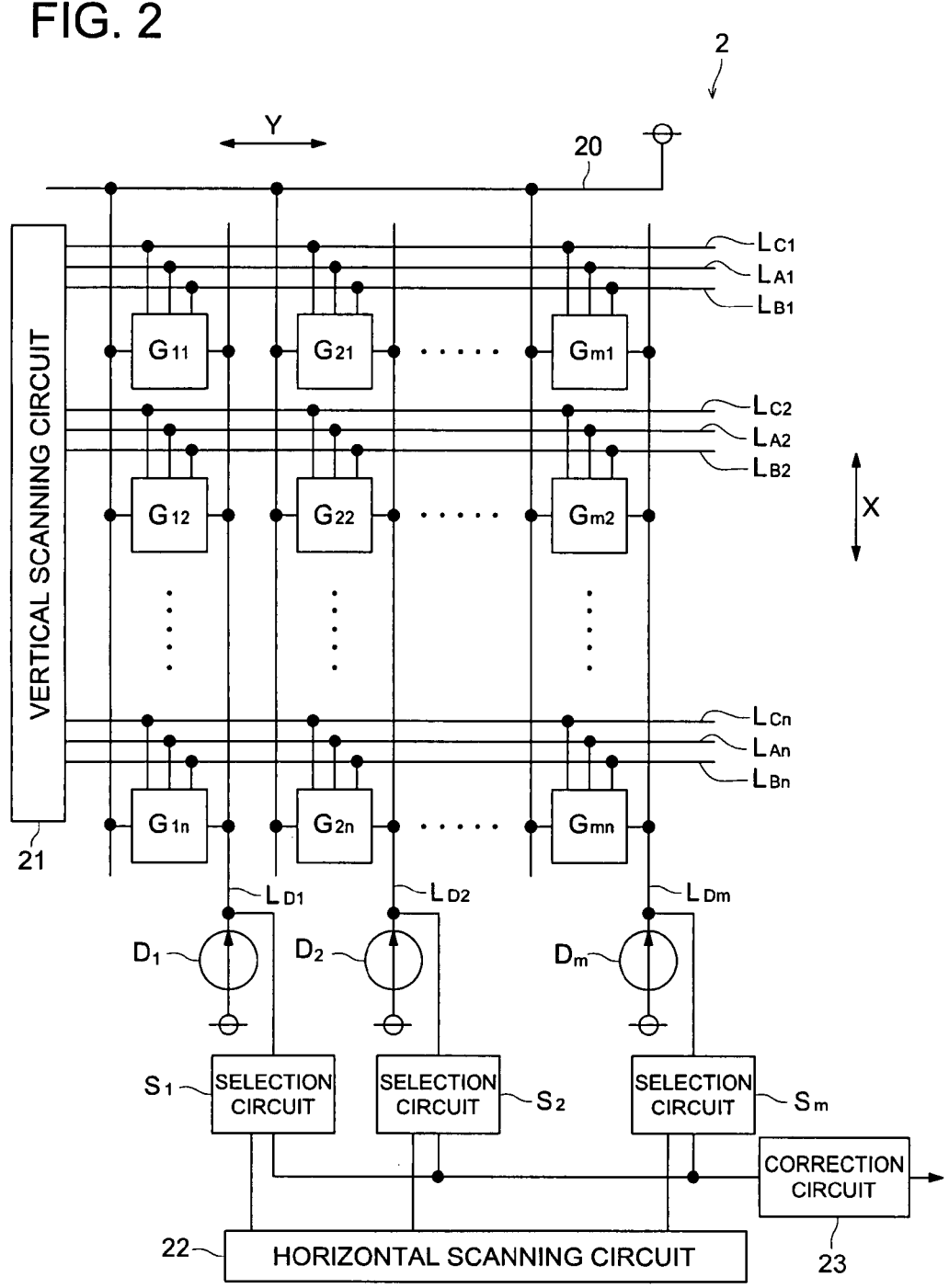
FIG. 2 is a block diagram showing the constitution of the imaging element.

The imaging element 2, as shown in FIG. 2, has a plurality of pixels G11 to Gmn (n and m are integers of 1 or larger) arranged in a matrix shape.

Each of the pixels G11 to Gmn converts photoelectrically incident light and outputs an electric signal. The pixels G11 to Gmn switch the conversion mode to the electric signal on the basis of the incident light intensity and in this embodiment, as indicated by a solid line in FIG. 3, for incident light intensity lower than a predetermined incident light intensity th, the linear conversion mode for linearly converting incident light is performed and for incident light intensity of the predetermined incident light intensity th or higher, the logarithm conversion mode for logarithmically converting incident light is performed.

Figure 4:
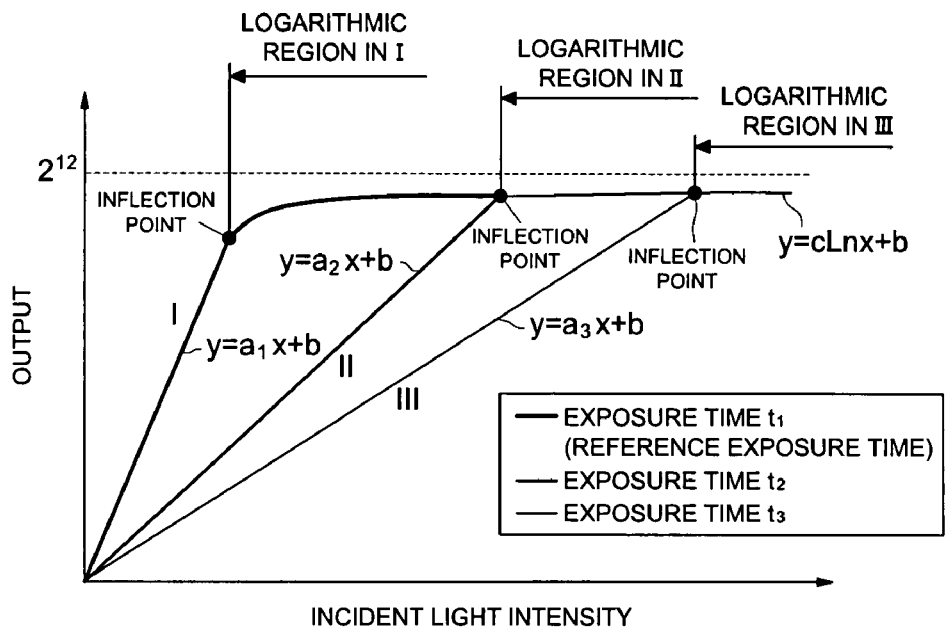
FIG. 4 is a drawing for showing the relationship between the exposure time and the inflection point.
Figure 5:
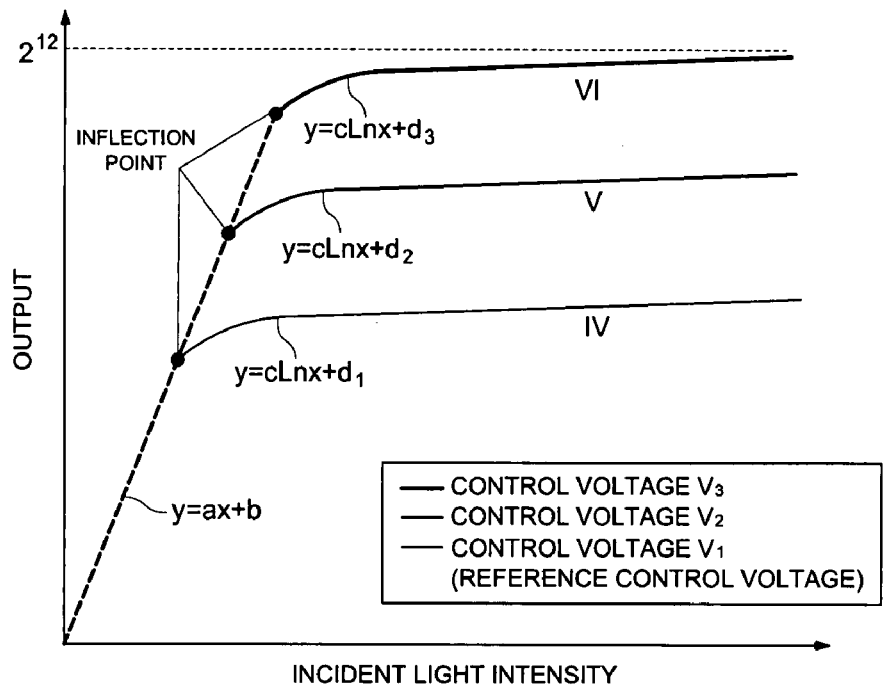
FIG. 5 is a drawing for showing the relationship between the control voltage and the inflection point.

Here, the boundary where the linear conversion mode and logarithm conversion mode are switched, that is, the so-called inflection point varies with the drive conditions of the pixels G11 to Gmn of the imaging element 2, for example, the exposure time and control voltage during imaging. Concretely, as shown in FIG. 4, as the exposure time is shortened in the order of t1 to t3, the output signal value at the inflection point (hereinafter, referred to as an inflection output signal value H) and the predetermined incident light intensity th increase in the order of I to III. Further, as shown in FIG. 5, as the control voltage is reduced in the order of V1 to V3, the inflection output signal value H of the pixels G11 to Gmn increases in the order of IV to VI. Further, in FIGS. 4 and 5, a1 to a3, b to d, a, and d1 to d3 are respectively constants. Among them, the inclinations a1 to a3 of the I/O characteristic in the linear conversion mode under the drive condition of the exposure time t1 to t3 are in proportion to the exposure time t1 to t3. Further, the sections d1 to d3 of the I/O characteristic in the logarithm conversion mode under the drive condition of the control voltages V1 to V3 are in proportion to the control voltages V1 to V3. Hereinafter, when the predetermined incident light intensity th is minimum, that is, when the rate of performance of the linear conversion mode is minimum and the rate of performance of the logarithm conversion mode is maximum, the exposure time t1 is assumed as reference exposure time.

On the side of the lens group 10 of the pixels G11 to Gmn, a filter (not drawn) of any one color of red, green, and blue is arranged. Further, to the pixels of G11 to Gmn, as shown in FIG. 2, a power source line 20, signal impression lines LA1 to LAn, LB1 to LBn, and LC1 to LCn, and signal reading lines LD1 to LDm are connected. Further, to the pixels G11 to Gmn, the lines such as a clock line and a bias supply line are connected, though the illustration of the lines is omitted in FIG. 2.

Figure 6:
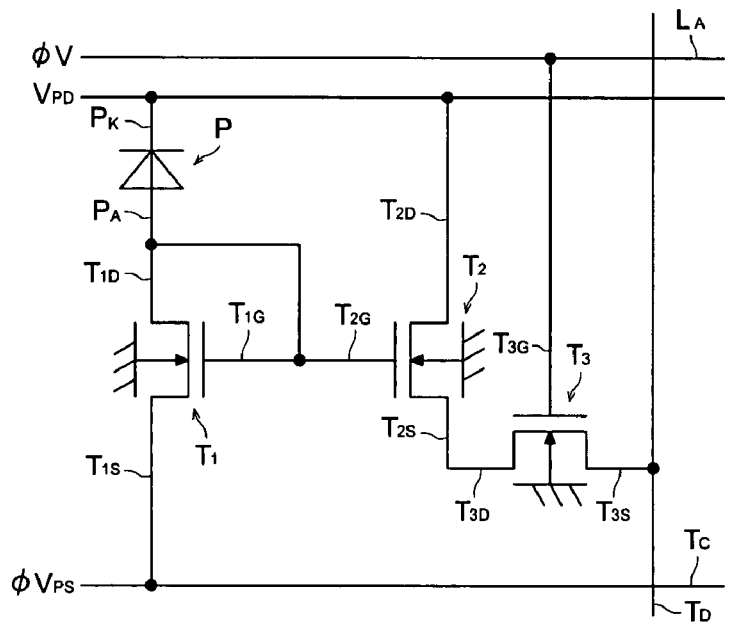
FIG. 6 is a circuit diagram showing the constitution of a pixel.

The signal impression lines LA1 to LAn, LB1 to LBn, and LC1 to LCn give signals φv and φVPS to the pixels G11 to Gmn (refer to FIG. 6). To the signal impression lines LA1 to LAn, LB1 to LBn, and LC1 to LCn, a vertical scanning circuit 21 is connected. The vertical scanning circuit 21, on the basis of a signal from a signal generation unit 48 (refer to FIG. 1) which will be described later, impresses a signal to the signal impression lines LA1 to LAn, LB1 to LBn, and LC1 to LCn and switches sequentially the signal impression lines LA1 to LAn, LB1 to LBn, and LC1 to LCn which are subjects of impression of a signal in the X direction.

To the signal reading lines LD1 to LDm, electric signals generated by the pixels G11 to Gmn are derived. To the signal reading lines LD1 to LDm, constant current sources D1 to Dm and selection circuits S1 to Sm are connected.

To one ends (the lower ends shown in the drawing) of the constant current sources D1 to Dm, a DC voltage VPS is impressed.

The selection circuits S1 to Sm sample-hold a noise signal given from the pixels G11 to Gmn via the signal reading lines LD1 to LDm and an electric signal at time of imaging. To the selection circuits S1 to Sm, a horizontal scanning circuit 22 and a correction circuit 23 are connected. The horizontal scanning circuit 22 switches sequentially the selection circuits S1 to Sm for sample-holding an electric signal and transmitting it to the correction circuit 23 in the Y direction. Further, the correction circuit 23, on the basis of a noise signal transmitted from the selection circuits S1 to Sm and an electric signal at time of imaging, removes the noise signal from the electric signal.

Further, for the selection circuits S1 to Sm and correction circuit 23, the ones disclosed in Japanese Patent Application Hei 2001-223948 can be used. Further, in this embodiment, the example that for all the selection circuits S1 to Sm, one correction circuit 23 is used is explained, though for each of the selection circuits S1 to Sm, one correction circuit 23 may be used.

To the imaging element 2 aforementioned, as shown in FIG. 1, via an amplifier 12 and an A-D converter 13, a black reference setting unit 14 and a signal processing unit 3 are connected in this order.

The black reference setting unit 14 sets a lowest level of a digital signal.

The signal processing unit 3 performs the signal processing for an electric signal outputted from the imaging element 2 in the logarithm conversion mode and has a linearization unit 31 and a fluctuation correction unit 30.

Figure 7:
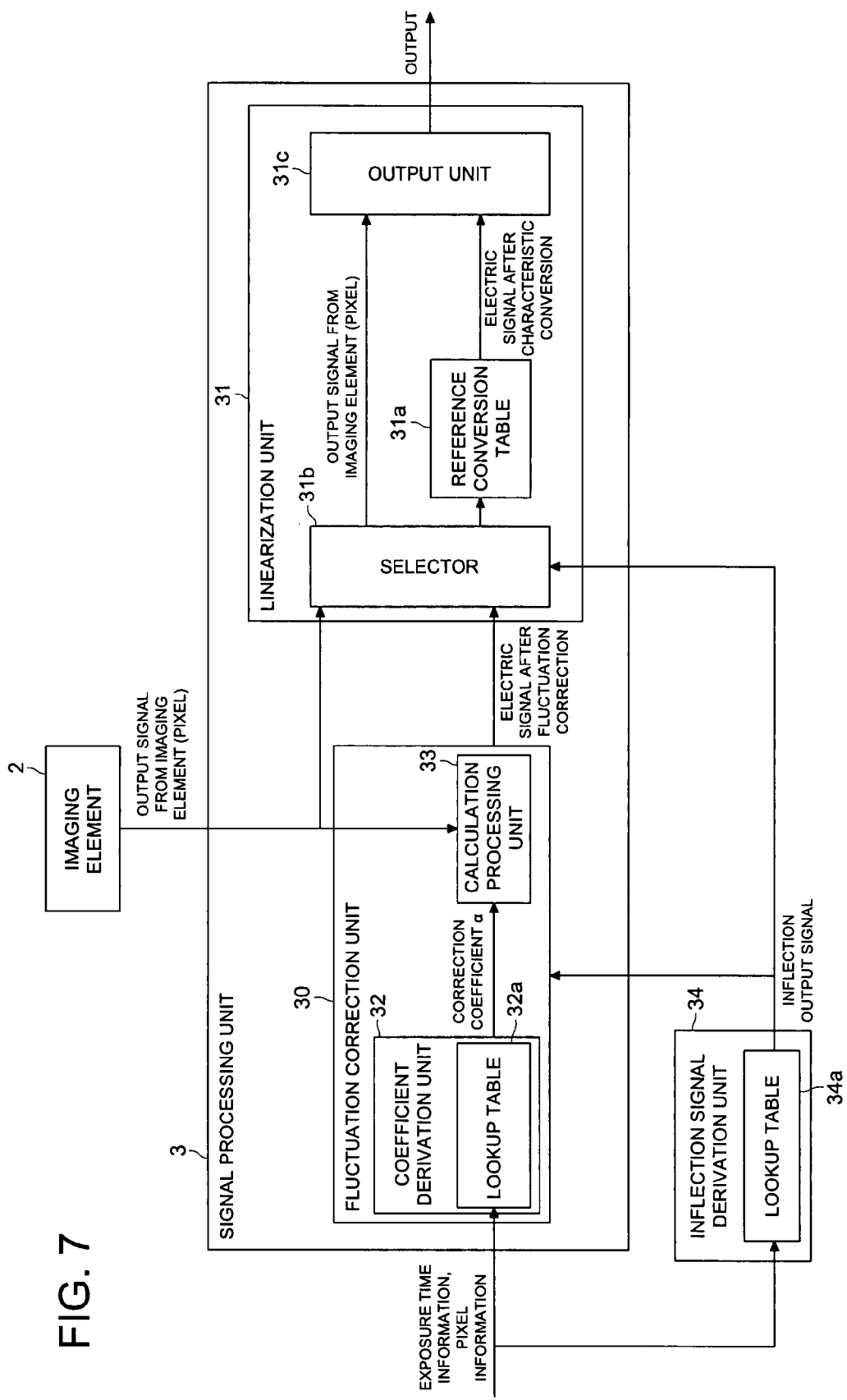
FIG. 7 is a block diagram showing the signal processing unit and inflection point signal derivation unit.

The linearization unit 31 is a characteristic conversion unit of the present invention and unifies output signals from the imaging element 2 to a state obtained by the linear conversion mode. The linearization unit 31, as shown in FIG. 7, includes a selector 31b, a reference conversion table 31a, and an output unit 31c. Further, in FIG. 7, the A-D converter 13 and a controller 46 are not drawn.

The selector 31b discriminates the magnitude relation between an electric signal from the imaging element 2 and the inflection output signal value H aforementioned, and when the electric signal from the imaging element 2 is larger than the inflection output signal value H, that is, an electric signal obtained by the logarithm conversion mode is outputted from the imaging element 2, outputs the output signal from the imaging element 2 to the reference conversion table 31a, and when it is the inflection output signal value H or smaller, outputs the output signal from the imaging element 2 to the output unit 31c.

Figure 3:
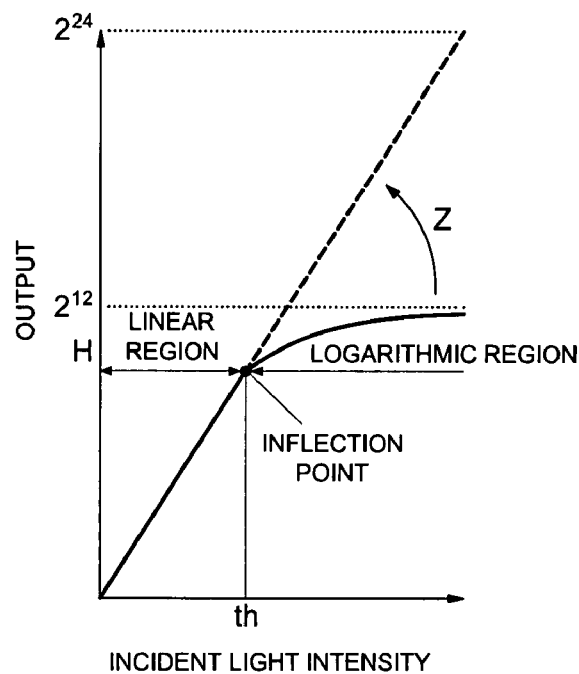
FIG. 3 is a drawing for explaining the operation of a pixel and the linearization unit.

The reference conversion table 31a, as shown by an arrow Z in FIG. 3, among electric signals outputted from the imaging element 2, characteristic-converts the electric signal obtained by the logarithm conversion mode to the state linearly converted from the incident light, that is, the state obtained by the linear conversion mode. The conversion characteristic of the reference conversion table 31a, when the drive conditions of the imaging element 2 are the predetermined reference conditions, in this embodiment, when the exposure time of the pixels G11 to Gmn is the reference exposure time t1 aforementioned, is set so that the electric signal outputted from the imaging element 2 in the logarithm conversion mode is exactly put into the state obtained by the linear conversion mode.

The output unit 31c outputs the electric signal inputted from the selector 31b or the reference conversion table 31a.

The fluctuation correction unit 30, when the I/O characteristic of the imaging element 2 is fluctuated due to the drive conditions of the imaging element 2, that is, in this embodiment, the exposure time of the pixels G11 to Gmn, performs fluctuation correction of the electric signal outputted from the imaging element 2.

The fluctuation correction unit 30, as shown in FIG. 7, includes a factor derivation unit 32 and a processing unit 33.

The factor derivation unit 32, on the basis of the exposure time information on the exposure time of the pixels G11 to Gmn and pixel information on the pixels G11 to Gmn, derives correction factors $\alpha 11$ to $\alpha mn$ for each of the pixels G11 to Gmn. And in this embodiment, the factor derivation unit 32 has a lookup table 32a for calculating the correction factors $\alpha 11$ to $\alpha mn$ by input of the exposure time information and pixel information.

Figure 8A:
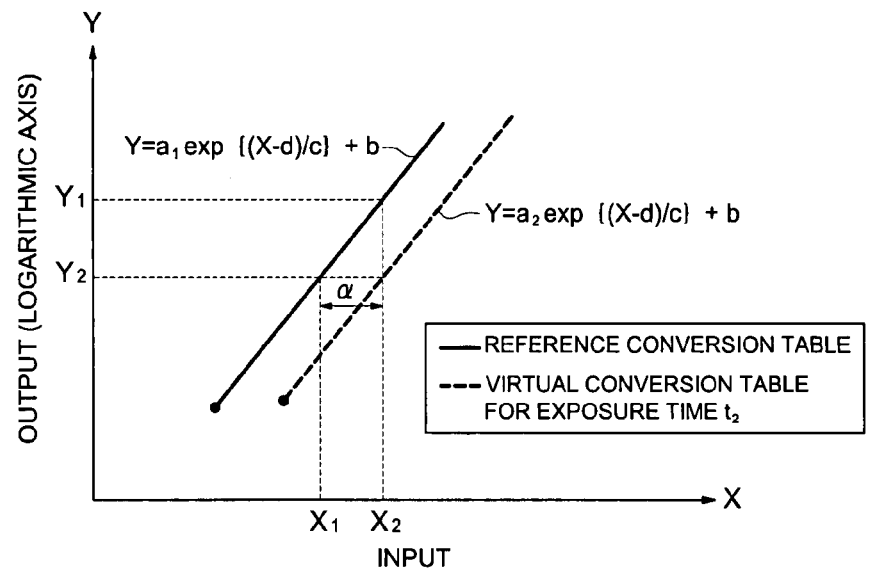
FIG. 8 is a drawing showing a correction factor α.

Here, for example, when the exposure time during imaging is the exposure time t2 (variable) aforementioned (refer to FIG. 4), the correction factor $\alpha$ is a value indicated as $\alpha = cLn(a1/a2) = cLn(t1/t2)$, in other words, as shown in FIG. 8, it is a distance on the input axis (the x axis shown in the drawing) between a virtual conversion table (refer to the dotted line shown in the drawing) having a conversion characteristic such that an electric signal outputted in the logarithm conversion mode from the imaging element 2 under the drive condition of the exposure time t2 is exactly put into the state obtained by the linear conversion mode and the reference conversion table 31a (refer to the solid line shown in the drawing). Further, such a virtual conversion table can be obtained by experiments or theoretical calculations and the virtual conversion table and reference conversion table 31a are in the mutual parallel relationship. Further, in FIG. 8(a), illustration of each conversion table for the linear region is omitted.

Further, as pixel information, intrinsic information such as the ID number of each of the pixels G11 to Gmn and position information in the imaging element are used.

The processing unit 33, on the basis of the correction factors $\alpha 11$ to $\alpha mn$ derived by the factor derivation unit 32, performs the fluctuation correction aforementioned for each of the pixels G11 to Gmn and in this embodiment, from an electric signal outputted from each of the pixels G11 to Gmn in the logarithm conversion mode, the correction factors $\alpha 11$ to $\alpha mn$ are subtracted. By doing this, the fluctuation-corrected electric signal obtained by the logarithm conversion mode enters the state that it can be exactly characteristic-converted to the electric signal obtained by the linear conversion mode by the reference conversion table 31a.

Concretely, for example, as shown in FIG. 8(a) aforementioned, the signal value of electric signals outputted in the logarithm conversion mode from the pixels G11 to Gmn under the drive condition of the exposure time t2 (refer to FIG. 4) is assumed as X2. In this case, when the signal value X2 obtained by the logarithm conversion mode is exactly characteristic-converted to the electric signal in the state obtained by the linear conversion mode, that is, when the signal value X2 is characteristic-converted by the virtual conversion table, the output signal value after characteristic conversion is Y2. On the other hand, when the signal value X2 is characteristic-converted straight by the reference conversion table 31a, the signal value after characteristic conversion is Y1, though when the signal value X1 ($=X2-\alpha$) obtained by subtracting the correction factor $\alpha$ from the signal value X2 is characteristic-converted by the reference conversion table 31a, the signal value after characteristic conversion is Y2. Namely, by subtracting the correction factor $\alpha$ from the signal value X2 obtained by the logarithm conversion mode, the electric signal after subtraction enters the state that it can be exactly characteristic-converted to the electric signal obtained by the linear conversion mode by the reference conversion table 31a.

To the signal processing unit 3, as shown in FIG. 1, an inflection signal derivation unit 34 and an image processing unit 4 are connected respectively.

The inflection signal derivation unit 34, on the basis of the exposure time information and pixel information, derives the inflection output signal value H and in this embodiment, as shown in FIG. 7, has a lookup table 34a for deriving the inflection output signal value H by input of the exposure time information and pixel information.

The image processing unit 4 performs the image process for image data composed of all the electric signals from the pixels G11 to Gmn and includes an AWB (auto white balance) processing unit 40, a color interpolation unit 41, a color correction unit 42, a gradation conversion unit 43, and a color space conversion unit 44. These AWB (auto white balance) processing unit 40, color interpolation unit 41, color correction unit 42, gradation conversion unit 43, and color space conversion unit 44 are connected to the signal processing unit 3 in this order.

The AWB processing unit 40 performs the white balance process for the image data and the color interpolation unit 41, on the basis of electrical signals from a plurality of proximity pixels in which the filters of the same color are installed, performs interpolation operations for the electric signal for the pixels positioned between the proximity pixels. The color correction unit 42 corrects the color balance of the image data and more in detail, corrects the electric color of each color for each of the pixels G11 to Gmn on the basis of the electric signals of the other colors. The gradation conversion unit 43 performs gradation conversion for the image data and the color space conversion unit 44 converts R, G, and B signals to Y, Cb, and Cr signals.

Further, to the signal processing unit 3, an evaluation value calculation unit 5 and the controller 46 are connected in this order.

The evaluation value calculation unit 5 calculates an AWB evaluation value used in the white balance process (AWB process) by the AWB processing unit 40 and an AE evaluation value used in the exposure control process (AE process) by an exposure control processing unit 47.

The controller 46 controls each unit of the imaging device 1 and as shown in FIG. 1, is connected to the amplifier 12, black reference setting unit 14, signal processing unit 3, inflection signal derivation unit 34, AWB processing unit 40, color interpolation unit 41, color correction unit 42, gradation conversion unit 43, and color space conversion unit 44 which are described above. Further, the controller 46 is connected to the aperture diaphragm 11 via the exposure control processing unit 47 and is connected to the imaging element 2 and A-D converter 13 via a signal generation unit 48.

Then, the pixels G11 to Gmn of this embodiment will be explained.

Each of the pixels G11 to Gmn, as shown in FIG. 6, includes a photodiode P and transistors T1 to T3. Further, the transistors T1 to T3 are a MOS transistor of a channel N with the back gate grounded.

On the photodiode P, light passing the lens group 10 and aperture diaphragm 11 strikes. To a cathode Pk of the photodiode P, a DC voltage VPD is impressed and to an anode PA, a drain T1D and a gate T1G of the transistor T1 and a gate T2G of the transistor T2 are connected.

To a source T1S of the transistor T1, a signal impression line LC (equivalent to LC1 to LCn shown in FIG. 2) is connected and from the signal impression line LC, a signal φVPS is inputted. Here, the signal φVPS is a binary voltage signal and more in detail, it takes two values of a voltage VH for operating the transistor T1 in the sub-threshold region when the incident light intensity exceeds a predetermined value and a voltage VL for putting the transistor T1 into the continuity state.

Further, to a drain T2D of the transistor T2, the DC voltage VPD is impressed and a T2S of the transistor T2 is connected to a drain T3D of the transistor T3 for row selection.

To the gate T3G of the transistor T3, a signal impression line LA (equivalent to LA1 to LAn shown in FIG. 2) is connected and from the signal impression line LA, a signal φV is inputted. Further, a source T3S of the transistor T3 is connected to a signal reading line LD (equivalent to LD1 to LDm shown in FIG. 2).

Further, for the pixels G11 to Gmn aforementioned, the ones disclosed in Japanese Patent Application 2002-77733 can be used.

Here, the reason that as shown in FIG. 4 aforementioned, as the exposure time is shortened, the rate of the linear conversion mode is increased is that as the exposure time is shortened, the potential difference between the gate T2G of the transistor T2 and the source T2S thereof is increased and the rate of the object brightness when the transistor T2 is operated in the cut-off state, that is, the rate of the object brightness converted linearly is increased. Further, although not illustrated in FIG. 4, when the control voltage for the imaging element 2, that is, the difference between the voltages VL and VH of the signal φVPS is increased or even when the temperature lowers, the rate of the object brightness converted linearly is increased. Therefore, by changing the control voltage, exposure time, and temperature, the dynamic range of an image signal, the predetermined incident light intensity th at the inflection point, and the inflection output signal value H can be controlled. Concretely, for example, when the brightness range of an object is narrow, the voltage VL is lowered and the brightness range converted linearly is widened, and when the brightness range of the object is wide, the voltage VL is increased and the brightness range converted logarithmically is widened, thus the photoelectric conversion characteristic of the pixels G11 to Gmn can be fit to the characteristic of the object. Furthermore, when minimizing the voltage VL, the pixels G11 to Gmn can be always put into the linear conversion state and when maximizing the voltage VL, the pixels G11 to Gmn can be always put into the logarithm conversion state.

Then, the imaging operation of the imaging device 1 will be explained.

Firstly, the imaging element 2 converts photoelectrically incident light to each of the pixels G11 to Gmn and outputs an electric signal obtained by the linear conversion mode or logarithm conversion mode as an analog signal. Concretely, as mentioned above, when each of the pixels G11 to Gmn outputs an electric signal to the signal reading line LD, the electric signal is amplified by the constant current source D and is sample-held sequentially by the selection circuit S. And, when the sample-held electric signal is sent from the selection circuit S to the correction circuit 23, the correction circuit 23 removes noise and outputs the electric signal.

Figure 9:
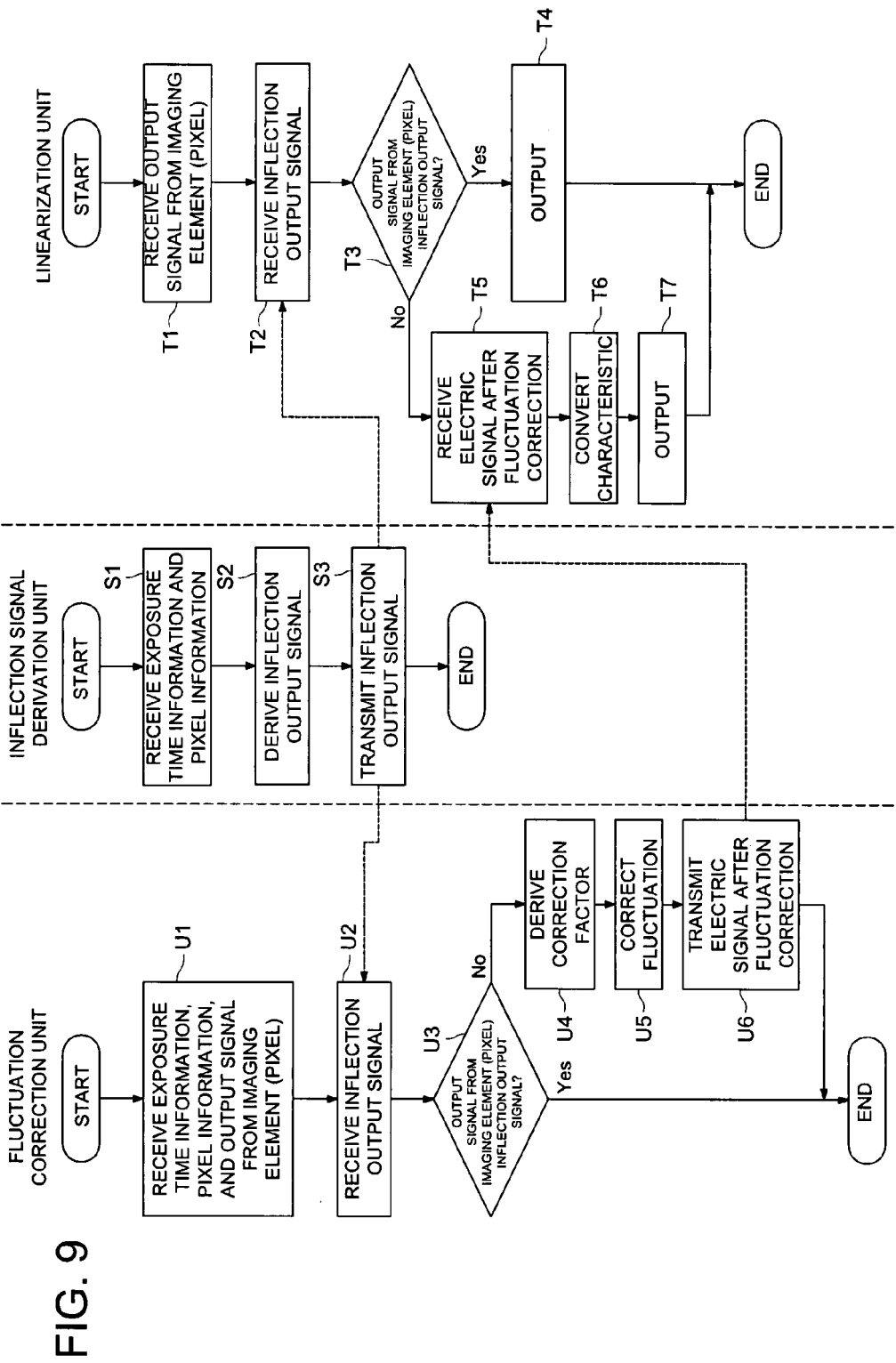
FIG. 9 is a flow chart showing the processes of fluctuation correction and characteristic conversion.

Next, the analog signal outputted from the imaging element 2 is amplified by the amplifier 12 and is converted to a digital signal by the A-D converter 13. Next, the black reference setting unit 14 sets the lowest level of the digital signal and as shown in FIG. 9, transmits the digital signal to the linearization unit 31 and fluctuation correction unit 30 of the signal processing unit 3 (Steps T1 and U1). Further, the controller 46 transmits the exposure time information and pixel information of each of the pixels G11 to Gmn of the imaging element 2 to the fluctuation correction unit 30 and inflection signal derivation unit 34 (Steps U1 and S1).

Upon receipt of the exposure time information and pixel information, the inflection signal derivation unit 34 derives the inflection output signal value H by the lookup table 34a (Step S2) and transmits it to the fluctuation correction unit 30 and the selector 31b of the linearization unit 31 (Step S3). As mentioned above, the lookup table 34a derives the inflection output signal value H on the basis of the exposure time and pixel information, so that the inflection output signal value H is derived exactly. Further, the inflection output signal value H is derived by the lookup table 34a, so that compared with the case of derivation by operations, the constitution of the inflection signal derivation unit 34 is simplified and the derivation processing is speeded up.

Upon receipt of the inflection output signal value H from the inflection signal derivation unit 34 (Step U2), the fluctuation correction unit 30 compares the magnitude between the signal values of the output signals from the pixels G11 to Gmn and the inflection output signal value H (Step U3) and when the signal values of the output signals from the pixels G11 to Gmn are the inflection output signal value H or smaller, that is, when the output signals from the pixels G11 to Gmn are the electric signal obtained by the linear conversion mode (Yes at Step U3), the fluctuation correction unit 30 finishes the process. On the other hand, at Step U3, when the output signals from the pixels G11 to Gmn are larger than the inflection output signal value H (No at Step U3), the fluctuation correction unit 30 derives the correction factors α11 to αmn for each of the pixels G11 to Gmn by the lookup table 32a (Step U4), performs fluctuation correction for each of the pixels G11 to Gmn by the processing unit 33 (Step U5), and then transmits the electric signal after fluctuation correction to the selector 31b of the linearization unit 31 (Step U6).

As mentioned above, when the I/O characteristic of the pixels G11 to Gmn is fluctuated due to the exposure time of the pixels G11 to Gmn, fluctuation correction of electric signals outputted from the pixels G11 to Gmn is performed by the fluctuation correction unit 30, so that even if the I/O characteristic is fluctuated depending on the drive conditions, variations between the output value at the reference exposure time t1 and the actual output values of the pixels G11 to Gmn are corrected. Further, the factor derivation unit 32 derives the correction factors α11 to αmn on the basis of the exposure time and pixel information during imaging, so that the derived correction factors α11 to αmn are used by the processing unit 33, thus the fluctuation of the I/O characteristic of the imaging element 2 due to the exposure time and pixels G11 to Gmn is corrected exactly. Further, the correction factors α11 to αmn are derived by the lookup table 32a, so that compared with the case that the correction factors α11 to αmn are derived by operations, the constitution of the factor derivation unit 32 is simplified and the derivation processing is speeded up. Further, fluctuation correction is performed only when the output signals from the pixels G11 to Gmn are the electric signal obtained by the logarithm conversion mode, so that when the output signals are the electric signal obtained by the linear conversion mode, that is, when there is no need to convert the electric signal obtained by the logarithm conversion mode to a state obtained by another conversion mode, fluctuation correction is not performed uselessly, so that the signal processing is speeded up.

Further, upon receipt of the inflection output signal value. H from the inflection signal derivation unit 34 (Step T2), the selector 31b of the linearization unit 31 compares the magnitude between the signal values of the output signals from the pixels G11 to Gmn and the inflection output signal value H (Step T3) and when the output signals from the pixels G11 to Gmn are the inflection output signal value H or smaller (Yes at Step T3), outputs straight the output signals from the pixels G11 to Gmn via the output unit 31c (Step T4). On the other hand, when the output signals from the pixels G11 to Gmn are larger than the inflection output signal value H (No at Step T3), the selector 31b receives the electric signal after fluctuation correction from the fluctuation correction unit 30 (Step T5), permits the reference conversion table 31a to perform characteristic conversion for the electric signal (Step T6), and outputs it via the output unit 31c (Step T7)

As mentioned above, only when the output signals from the pixels G11 to Gmn are the electric signal obtained by the logarithm conversion mode, characteristic conversion is performed, so that when the output signals are the electric signal obtained by the linear conversion mode, that is, when there is no need to convert the electric signal obtained by the logarithm conversion mode to the state obtained by another conversion mode, fluctuation correction is not performed uselessly, so that the signal processing is speeded up.

Next, on the basis of the electric signal outputted from the linearization unit 31, the evaluation value calculation unit 5 calculates the AWB evaluation value and AE evaluation value.

Next, on the basis of the AE evaluation value calculated, the controller 46 controls the exposure control processing unit 47 and permits it to adjust the amount of the exposure for the imaging element 2.

Further, on the basis of the AWB evaluation value and the minimum level set by the black reference setting unit 14, the controller 46 controls the AWB processing unit 40 and permits it to perform the white balance process for image data outputted from the signal processing unit 3.

And, on the basis of the image data outputted from the AWB processing unit 40, the color interpolation unit 41, color correction unit 42, gradation conversion unit 43, and color space conversion unit 44 perform respectively the image processing and then output image data.

According to the imaging device 1 aforementioned, even if the I/O characteristic is fluctuated depending on the drive conditions, unlike the conventional way, variations between the output value at the reference exposure time t1 and the actual output values can be corrected, so that by characteristic conversion by the linearization unit 31, electric signals can be exactly unified to the state obtained by the linear conversion mode.

Further, for the plurality of pixels G11 to Gmn, only one fluctuation correction unit 30 is installed, so that compared with the case that a plurality of fluctuation correction units 30 are installed in correspondence to the respective pixels G11 to Gmn, the constitution of the imaging device 1 can be simplified.

Modification of Embodiment

Next, a modification of the embodiment aforementioned will be explained. Further, to the same components as those of the embodiment aforementioned, the same numerals are assigned and the explanation thereof will be omitted.

The fluctuation correction unit 30 of this modification, when the I/O characteristic of the pixels G11 to Gmn is fluctuated due to the control voltage for each of the pixels G11 to Gmn, performs fluctuation correction of the electric signals outputted from the pixels G11 to Gmn.

Figure 8B:
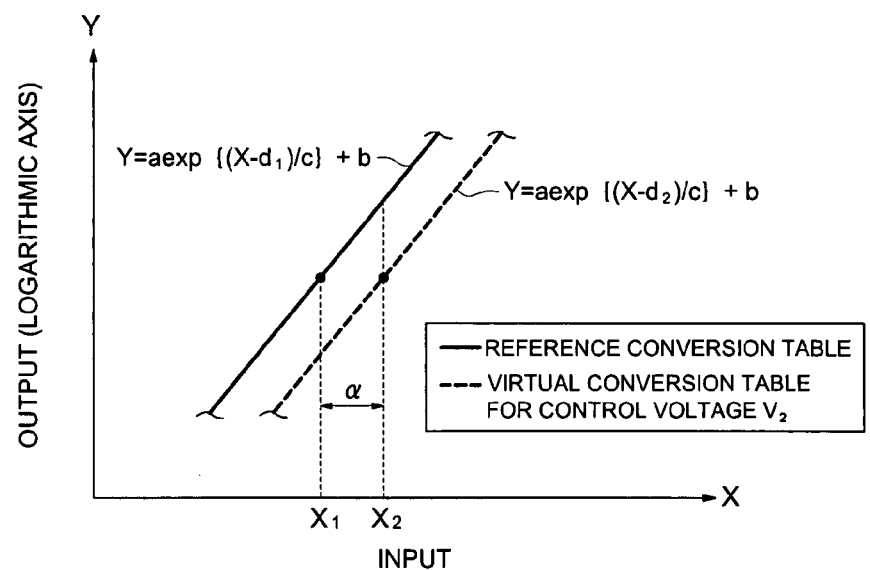

Concretely, the factor derivation unit 32 of the fluctuation correction unit 30, as shown in FIGS. 5 and 8(b) assumes the control voltage V1 when the predetermined incident light intensity th is minimum as a reference control voltage and uses a distance of "X2−X1"=d2−d1=m2V2−m1V1(m2=d2/V2, m1=d1/V1) on the input axis (the x axis shown in FIG. 8(b)) between a virtual conversion table corresponding to the drive condition of the control voltage V2 (variable) and the reference conversion table 31a corresponding to the drive condition of the reference control voltage V1 as a correction factor α.

Even in such a case, the same effect as that of the first embodiment aforementioned can be obtained.

Further, in the first embodiment and modification aforementioned, it is explained that the fluctuation correction unit 30 is arranged at the preceding stage of the linearization unit 31, though it may be arranged at the later stage thereof or it is possible to install the factor derivation unit 32 at the preceding stage of the linearization unit 31 and the processing unit 33 at the later stage thereof.

Further, as drive conditions for the imaging element 2, use of the exposure time and control voltage is explained, though temperature may be used.

Further, it is explained that the fluctuation correction unit 30 has the processing unit 33 for deriving an electric signal after fluctuation correction, though it may have a lookup table, by input of the drive conditions, pixel information, and an electric signal outputted from the imaging element 2, for deriving the electric signal after fluctuation correction. In this case, the same effect as that of the embodiment aforementioned can be obtained and compared with the case that an electric signal after fluctuation correction is derived by operations, the constitution of the fluctuation correction unit 30 can be simplified.

Further, it is explained that only one fluctuation correction unit 30 and one linearization unit 31 are installed, though a plurality of units may be installed in correspondence to each of the pixels G11 to Gmn. Particularly, when a plurality of linearization units 31 are installed, even if the pixels G11 to Gmn are different in the conversion characteristic of photoelectric conversion from each other, all the electric signals can be exactly unified to the state obtained by the linear conversion mode or the logarithm conversion mode. Further, when a plurality of fluctuation correction units 30 are installed, even if the fluctuation amount of the I/O characteristic is different for each of the pixels G11 to Gmn, fluctuation correction can be performed exactly.

Further, it is explained that the factor derivation unit 32, on the basis of the drive conditions and pixel information, derives the correction factors $\alpha 11$ to $\alpha mn$ for each of the pixels G11 to Gmn, though on the basis of only the drive conditions, the correction factor $\alpha$ common to the pixels G11 to Gmn may be derived.

Further, it is explained that the factor derivation unit 32 has the reference conversion table 31a for deriving the correction factor, though it may install an operational unit for deriving a correction factor by input of the drive conditions and others.

Further, it is explained that the characteristic conversion unit of the present invention is the linearization unit 31 for characteristic-converting the electric signal obtained by the logarithmic conversion mode to the state generated by linear conversion, though the electric signal obtained by the linear conversion mode may be characteristic-converted to the state obtained by the logarithm conversion mode.

Further, it is explained that the inflection signal derivation unit 34 derives the inflection output signal value H on the basis of the drive conditions and pixel information, though it may be derived on the basis of only the drive conditions. Further, it is explained that the inflection signal derivation unit 34 has the lookup table 34a for deriving the inflection output signal value H, though it may have an operational unit for deriving the inflection output signal value H.

Further, it is explained that the linearization units 31 and 36 perform characteristic conversion by the reference conversion table 31a, though the units may perform it by operations such as exponential conversion.

Further, if is explained that the pixels G11 and Gmn have the constitution as shown in FIG. 6, though if the linear conversion mode and logarithm conversion mode can be switched, the pixels may have the constitution as disclosed in Patent Document 1 aforementioned.

Further, it is explained that the pixels G11 and Gmn are equipped with R, G, and B filters, though the pixels may be equipped with filters of other colors such as cyan, magenta, and yellow.

What is claimed is:

1. An imaging device comprising:
   an imaging element having a plurality of pixels which switch, based on incident light intensity, between a linear conversion mode for linearly converting incident light to an electric signal and a logarithmic conversion mode for logarithmically converting the incident light to an electric signal;
   a correction unit for, when an electric signal converted logarithmically and outputted from said imaging element varies from a reference electric signal, correcting said logarithmically converted electric signal outputted from said imaging element so as to coincide with said reference electric signal; and
   a conversion unit for converting the corrected electric signal to an electric signal that would have been obtained by linearly converting the incident light to an electric signal, and for outputting the converted electric signal.

2. An imaging device according to claim 1, wherein said correction unit corrects said logarithmically converted electric signal outputted from said imaging element so as to coincide with said reference electric signal based on drive conditions of said imaging element.

3. An imaging device according to claim 2, wherein said correction unit has a lookup table to which said drive conditions are inputted to obtain a correction factor.

4. An imaging device according to claim 1, wherein said imaging device comprises a plurality of correction units and a plurality of conversion units corresponding respectively to said pixels of said imaging element.

5. An imaging device according to claim 1, wherein said correction unit corrects said electric signal for each of said pixels of said imaging element.

6. An imaging device according to claim 2, wherein said drive conditions comprise at least one of a temperature during imaging, an exposure time of said pixels, and a control voltage for said pixels.

7. An imaging device according to claim 2, wherein said correction unit has a lookup table to which said drive conditions and said logarithmically converted electric signal outputted from said imaging element are inputted, and which outputs said corrected electric signal.

8. An image imaging device comprising:
   an imaging element having a plurality of pixels for linearly converting incident light and outputting an electric signal based on incident light intensity, when said incident light intensity is lower than a predetermined light intensity, and for logarithmically converting the incident light and outputting said electric signal based on said incident light intensity, when said incident light intensity is equal to or higher than said predetermined light intensity;
   a correction unit for, when an electric signal converted logarithmically and outputted from said imaging element varies from a reference electric signal, correcting said logarithmically converted electric signal outputted from said imaging element so as to coincide with said reference electric signal; and
   a conversion unit for converting the corrected electric signal to an electric signal that would have been obtained by linearly converting the incident light to an electric signal, and for outputting the converted electric signal.

9. An imaging device according to claim 8, wherein said correction unit corrects said logarithmically converted electric signal outputted from said imaging element so as to coincide with said reference electric signal based on drive conditions of said imaging element.

10. An imaging device according to claim 9, wherein said correction unit has a lookup table to which said drive conditions are inputted to obtain a correction factor.

11. An imaging device according to claim 8, wherein said correction unit corrects said electric signal for each of said pixels of said imaging element.

12. An image imaging device comprising:
  an imaging element having a plurality of pixels for linearly converting incident light and outputting an electric signal based on incident light intensity, when said incident light intensity is lower than a predetermined light intensity, and for logarithmically converting the incident light and outputting said electric signal based on said incident light intensity, when said incident light intensity is equal to or higher than said predetermined light intensity;
  a derivation unit for deriving an inflection point signal indicating a point at which said linear converting is switched to said logarithmic converting;
  a correction unit for, when an electric signal converted logarithmically and outputted from said imaging element varies from a reference electric signal, correcting said logarithmically converted electric signal outputted from said imaging element so as to coincide with said reference electric signal;
  a comparison unit for comparing said inflection point signal derived by said derivation unit with the corrected electric signal outputted from said correction unit; and
  a conversion unit for, when a result of comparison by said comparison unit indicates that said corrected electric signal is larger than said inflection point signal, converting said corrected electric signal to an electric signal that would have been obtained by linearly converting the incident light to an electric signal, and outputting the converted electric signal.

13. An imaging device according to claim 12, wherein said derivation unit derives said inflection point signal based on drive conditions of said imaging element.

14. An imaging device according to claim 13, wherein said derivation unit has a lookup table to which said drive conditions of said imaging element are inputted to derive said inflection point signal.

15. An imaging device according to claim 13, wherein said derivation unit derives said inflection point signal based on said drive conditions of said imaging element and a characteristic of each pixel.

16. An imaging device according to claim 13, wherein said drive conditions comprise at least one of a temperature during imaging, an exposure time of said pixels, and a control voltage for said pixels.

* * * * *